United States Patent
Shimomura

(10) Patent No.: US 6,888,556 B2
(45) Date of Patent: *May 3, 2005

(54) IMAGE FORMING APPARATUS WITH END OF OPERATING LIFETIME CONTROLLER

(75) Inventor: Haruyuki Shimomura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/391,556

(22) Filed: Mar. 20, 2003

(65) Prior Publication Data
US 2003/0184639 A1 Oct. 2, 2003

(30) Foreign Application Priority Data
Mar. 29, 2002 (JP) ........................................ 2002-095989

(51) Int. Cl.[7] .......................... B41J 2/385; G03G 13/04; G03G 15/04
(52) U.S. Cl. .......................... 347/129; 347/133; 399/32
(58) Field of Search ................................ 347/129, 131, 347/132, 133, 140, 236, 237, 247, 246, 233; 399/32

(56) References Cited

U.S. PATENT DOCUMENTS

| | | | | |
|---|---|---|---|---|
| 5,583,621 A | * | 12/1996 | Narukawa | ...................... 399/58 |
| 5,602,637 A | * | 2/1997 | Hara et al. | ................... 399/223 |
| 6,037,963 A | * | 3/2000 | Denton et al. | ............... 347/233 |
| 6,476,846 B1 | | 11/2002 | Kashima et al. | |

FOREIGN PATENT DOCUMENTS

| | | |
|---|---|---|
| JP | A-5-236213 | 9/1993 |
| JP | A-7-276699 | 10/1995 |
| JP | B2-2505226 | 4/1996 |
| JP | A-8-123257 | 5/1996 |
| JP | 08-171061 | 7/1996 |
| JP | A-10-202942 | 8/1998 |
| JP | A-10-213771 | 8/1998 |
| JP | A-10-319789 | 12/1998 |
| JP | 2000-118040 A | * 4/2000 |
| JP | A-2001-293903 | 10/2001 |
| JP | 2002-149034 A | * 5/2002 |

* cited by examiner

Primary Examiner—Susan Lee
(74) Attorney, Agent, or Firm—Oliff & Berridge, PLC

(57) ABSTRACT

An image forming apparatus having a photosensitive member, an exposure device having a laser emitting element that irradiates a laser beam, the laser beam being scanned on the photosensitive member line by line to form an electrostatic latent image on the photosensitive member, a developing device that supplies a developing agent to the electrostatic latent image to form a visible image, and a controller that controls the laser emitting element to irradiate the laser beam in a predetermined light amount. The controller further controls the laser emitting element to irradiate the laser beam in a reduced light amount every at least one line.

19 Claims, 10 Drawing Sheets

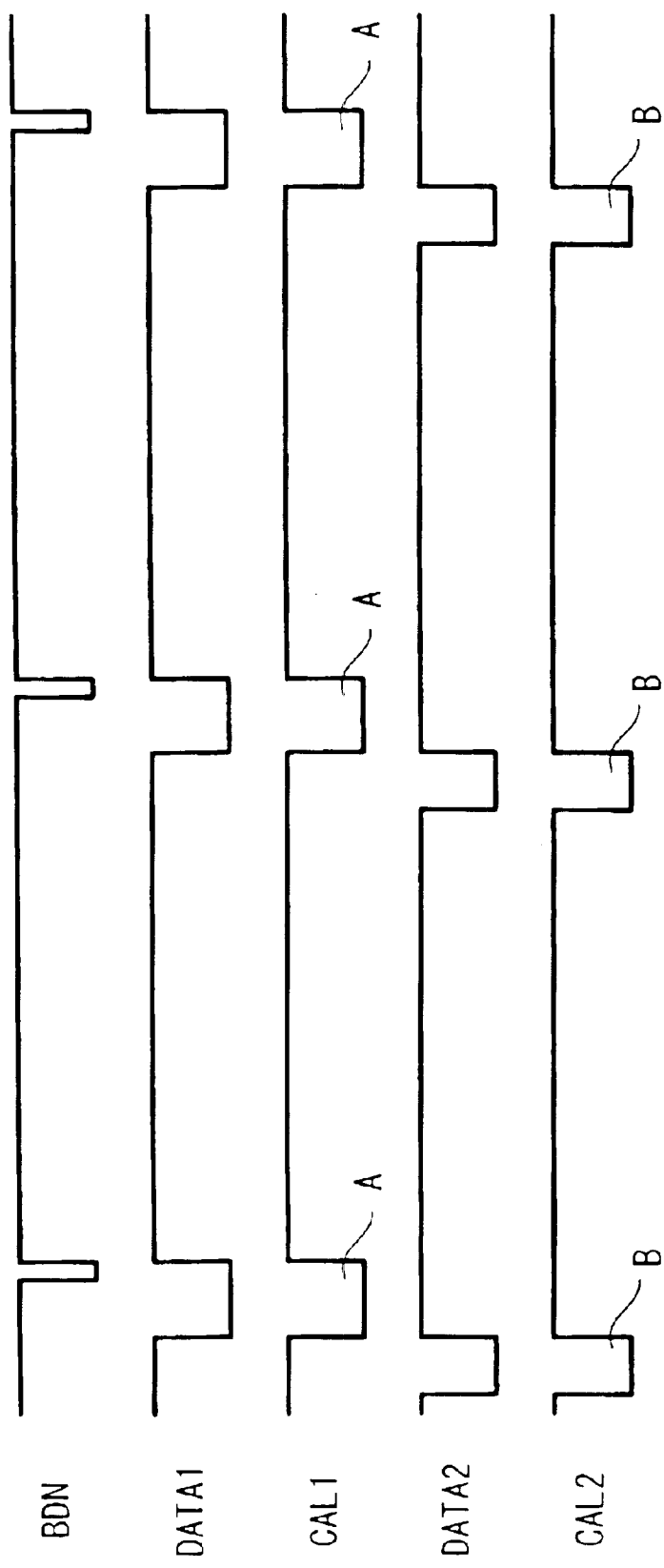

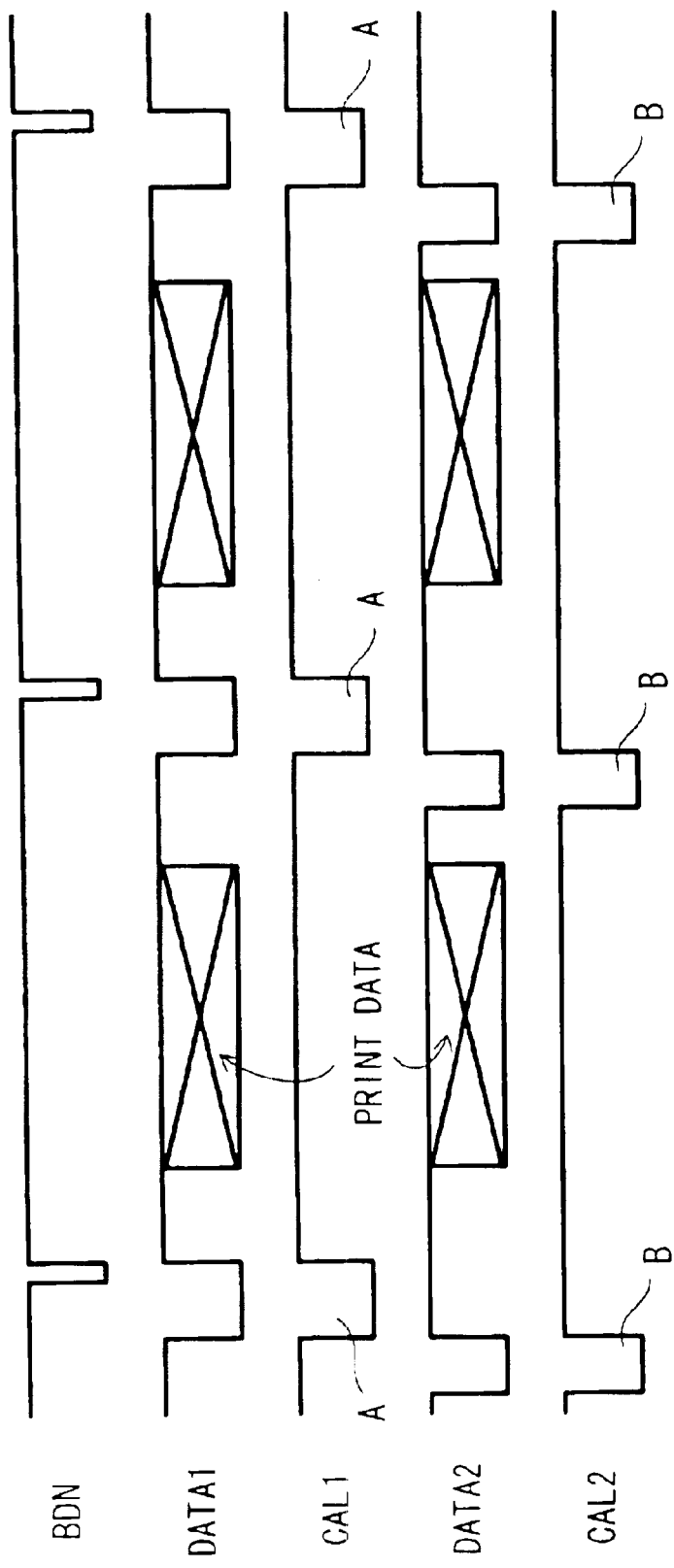

CURRENT SUPPLIED TO LASER DIODE

DOT SHAPE

IMAGE FORMING APPARATUS WITH END OF OPERATING LIFETIME CONTROLLER

BACKGROUND OF THE INVENTION

1. Field of Invention

The invention relates to an image forming apparatus that forms an image by exposing a photosensitive member to a plurality of laser beams.

2. Description of Related Art

A laser printer is generally known as an electrophotographic image forming apparatus. In the laser printer, a uniformly charged surface of a photosensitive member is exposed to a beam of laser light emitted based on image data, to form an electrostatic latent image on the surface of the photosensitive member. The electrostatic latent image attaches toner thereto. An image is formed onto a sheet as the tone is transferred to the sheet.

As disclosed in, for example, U.S. Pat. No. 6,476,846, a plurality of laser beam emitting devices that emit laser beams are provided for a laser printer. The resolution of an image is improved by exposing the photosensitive member to the laser beams emitted from each of the plurality of laser beam emitting devices.

More specifically, as two laser beam emitting devices are controlled in parallel, the photosensitive member is scanned with the laser beams two lines at a time. Thus, line density is increased without reducing the rotating speed of the photosensitive member.

For example, an image of 1200 dpi resolution is formed with a laser printer having two laser beam emitting devices, by driving the photosensitive member at the same rotating speed as an image of 600 dpi resolution is formed with one laser beam emitting device.

For example, Japanese Laid Open Patent Publication No. 10-202942 discloses an image forming apparatus capable of scanning two lines at a time, using two laser diodes. In the image forming apparatus, driving of one of the laser diodes is stopped to thin out or skip one line. Accordingly, a toner consumption amount can be reduced.

SUMMARY OF THE INVENTION

The invention is directed to an image forming apparatus including a photosensitive member, an exposure device having a laser emitting element that irradiates a laser beam, the laser beam being scanned on the photosensitive member line by line to form an electrostatic latent image on the photosensitive member, a developing device that supplies a developing agent to the electrostatic latent image to form a visible image, and a controller that controls the laser emitting element to irradiate the laser beam in a predetermined light amount. The controller further controls the laser emitting element to irradiate the laser beam in a reduced light amount every at least one line.

BRIEF DESCRIPTION OF THE DRAWINGS

An exemplary embodiment of the invention will be described in detail with reference to the following figures wherein:

FIG. 8 is a time chart illustrating changes of various signals in a laser light output adjustment process performed during the main routine;

FIG. 9 is a time chart illustrating changes of various signals in a printing operation performed during the main routine.

DETAILED DESCRIPTION OF PREFERRED EMBODIMENTS

An exemplary embodiment of the invention will be described in detail with reference to the figures.

Figure 1:
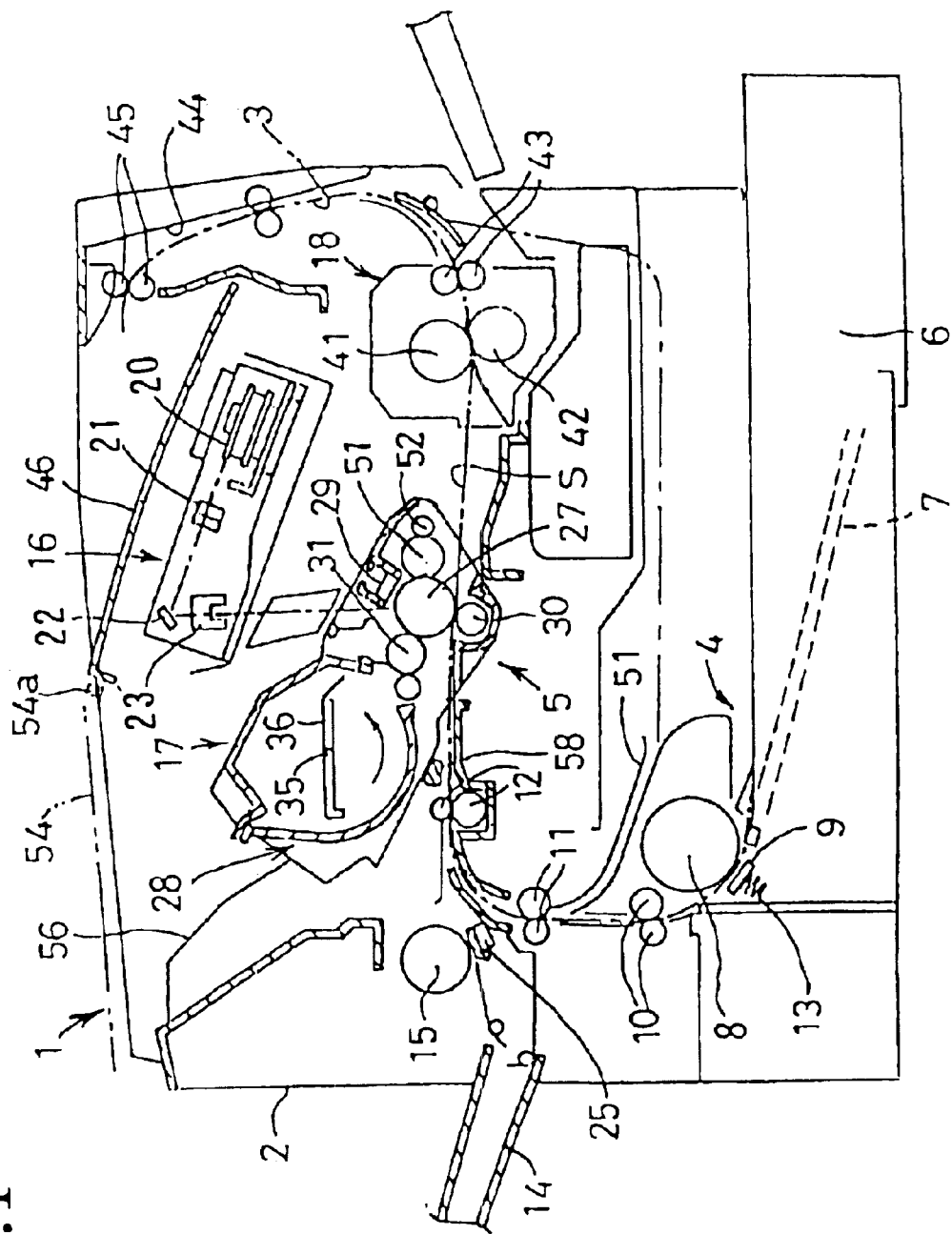
FIG. 1 is a side cross-sectional view showing a laser printer according to an embodiment of the invention.

FIG. 1 is a side cross-sectional view showing a laser printer 1 of an image forming apparatus according to an exemplary embodiment of the invention. As shown in FIG. 1, the laser printer 1 is provided in a main casing 2 with a feeder unit 4 that feeds sheets 3 of paper as a recording medium, and an image forming unit 5 that forms an image on the paper sheet 3.

The feeder unit 4 includes a paper tray 6, a paper mounting plate 7, a pick-up roller 8, a separation pad 9, paper powder removing rollers 10, conveying rollers 11 and register rollers 12. The paper tray 6 is removably set in the bottom of the main casing 2. The paper mounting plate 7 is provided in the paper tray 6. The pick-up roller 8 and the separation pad 9 are provided at an upper end of the paper tray 6. The paper powder removing rollers 10 and the conveying rollers 11 are provided downstream of the pick-up roller 8 in a sheet feeding direction. The register rollers 12 are provided downstream of the conveying rollers 11 in the sheet feeding direction.

The paper mounting plate 7 supports a stack of the paper sheets 3. The paper mounting plate 7 pivots on one end far from the pick-up roller 8, so that the other end of the paper mounting plate 7 near the pick-up roller 8 can move up and down. A spring (not shown) is disposed on the underside of the paper mounting plate 7 to urge the paper mounting plate 7 upwardly. As the amount of the paper sheets 3 stacked on the paper mounting plate 7 increases, the mounting plate 7 pivots downward about the one end far from the pick-up roller 8, against an urging force of the spring. The pick-up roller 8 and the separation pad 9 are disposed to face each other. A spring 13 disposed on the underside of the separation pad 9 presses the separation pad 9 against the pick-up roller 8.

The topmost paper sheet 3 on the paper mounting plate 7 is urged toward the pick-up roller 8 by the spring (not shown) disposed on the underside of the paper mounting plate 7. As the pick-up roller 8 rotates, a leading end portion of the topmost sheet 3 is nipped between the pick-up roller 8 and the separation pad 9. In this manner, each topmost sheet 3 is separated from the sheets 3 mounted on the paper mounting plate 7. The paper sheet 3 is fed to the paper powder removing rollers 10 where paper powders are removed. Thereafter, the paper sheet 3 is fed to a pair of register rollers 12. The register rollers 12 register the paper sheet 3, and then feed the paper sheet 3 to an image forming portion where a tone image is transferred onto the sheet 3. In this exemplary embodiment, the image forming portion is a contact portion where a photosensitive drum 27 and a transfer roller 30 contact each other.

The feeder unit 4 further includes a multi-purpose tray 14, as well as a multi-purpose pick-up roller 15 and a multi-purpose separation pad 25 that feed the sheet 3 stacked on the multi-purpose tray 14. The multi-purpose pick-up roller 15 and the multi-purpose separation pad 25 are disposed so as to face each other. The multi-purpose separation pad 25 is pressed against the multi-purpose pick-up roller 15 by a spring (not shown) provided on the underside of the multi-purpose separation pad 25. As the multi-purpose pick-up roller 15 rotates, a leading end portion of an uppermost sheet 3 on the multi-purpose tray 14 is nipped between the multi-purpose pick-up roller 15 and the multi-purpose separation pad 25. In this manner, the sheets 3 stacked on the multi-purpose tray 14 are separated one by one. The sheet 3 separated from the sheet stack on the tray 14 is then delivered to the register rollers 12.

The image forming unit 5 includes a scanner unit 16, a process unit 17, and a fixing unit 18.

Figure 3:
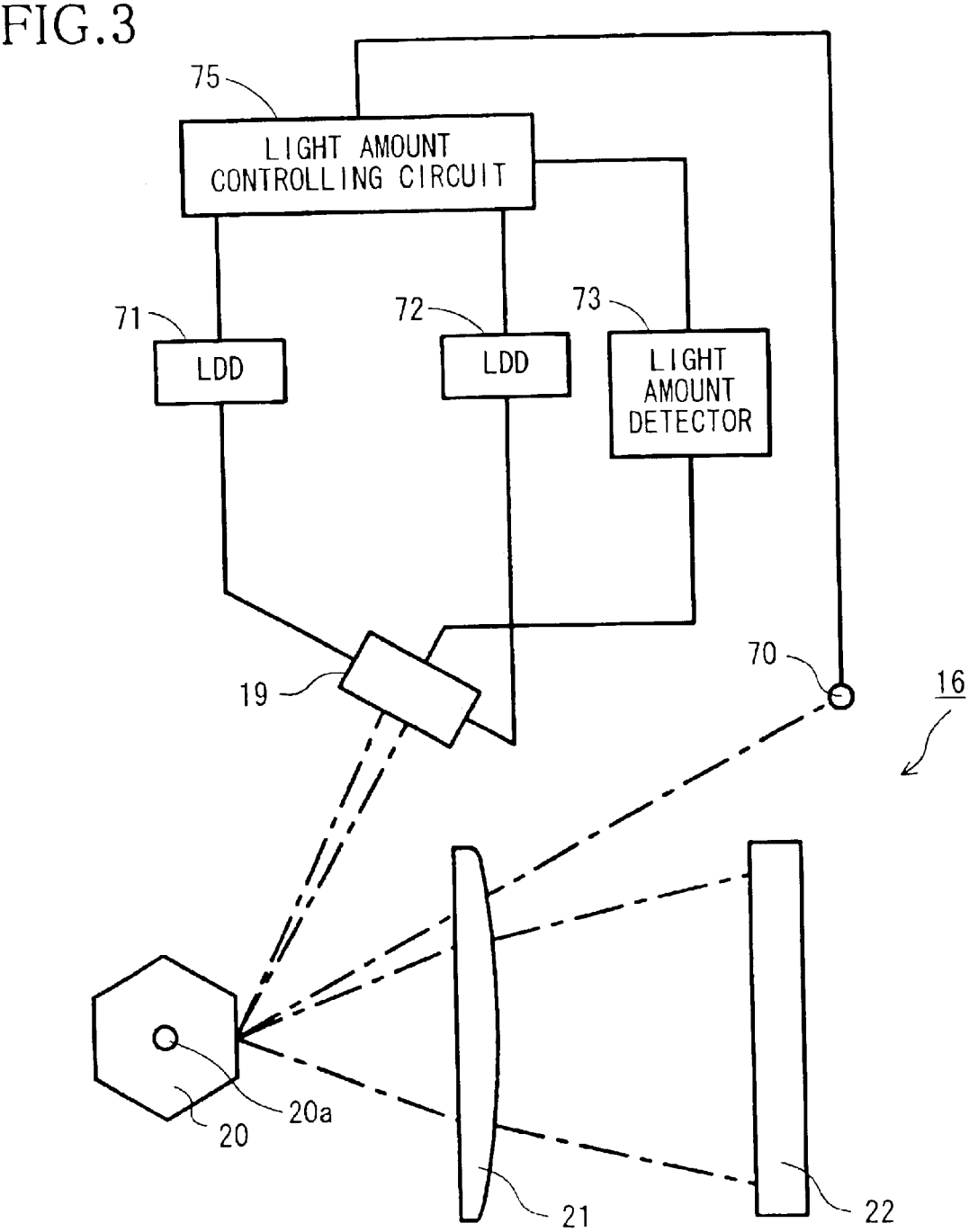
FIG. 3 is a schematic showing a scanner unit of the laser printer.
Figure 4:
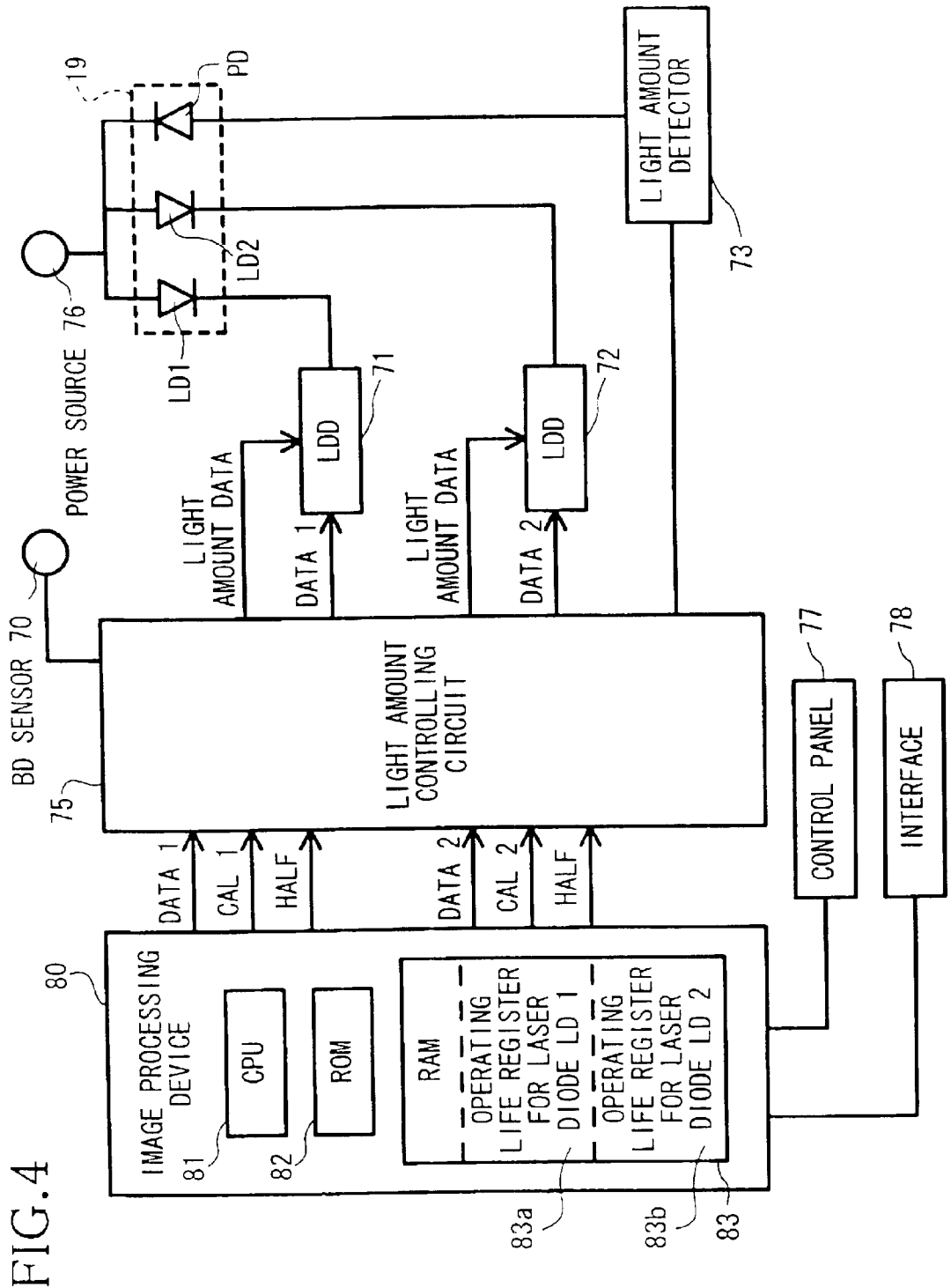
FIG. 4 is a block diagram illustrating structures of a control system for the scanner unit.

The scanner unit 16 is provided in an upper portion of the main casing 2 and below a discharge tray 46. The scanner unit 16 includes a laser diode array 19 (shown in FIG. 3), a polygon mirror 20 that is driven so as to spin, lenses 21 and 23, and a reflecting mirror 22. The laser diode array 19 includes two laser diodes LD1, LD2, as shown in FIG. 4, as laser light emitting portions. A beam of laser light emitted from each of the laser diodes LD1, LD2 passes through or reflects off the polygon mirror 20, the lens 21, the reflecting mirror 22, and the lens 23 in this order, as indicated by broken lines in FIG. 1, to scan at high speed across a surface of a photosensitive drum 27, in the process unit 17.

Figure 2:
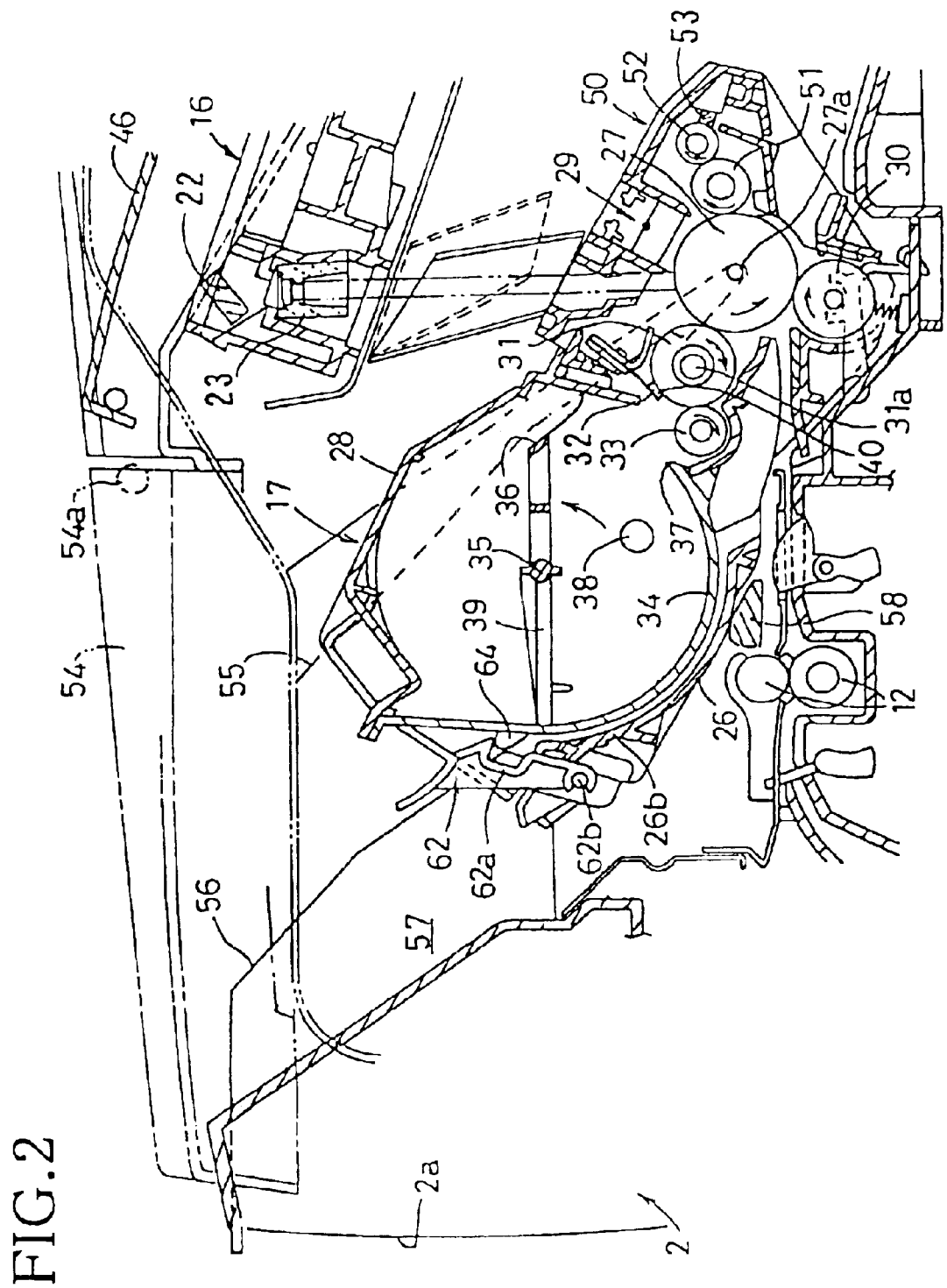
FIG. 2 is an enlarged side cross-sectional view showing essential parts of an image forming unit of the laser printer.

As shown in FIG. 2, the process unit 17 includes a photosensitive member cartridge 26. The photosensitive member cartridge 26 includes the photosensitive drum 27, a scorotron charger 29, a transfer roller 30, a cleaning roller 51 as a paper powder cleaning device, a secondary roller 52, and a slide member 53.

In the laser printer 1, residual toner remaining on the surface of the photosensitive drum 27 after the toner is transferred by the transfer roller 30 onto the sheet 3, is collected by a developing roller 31. This toner collection manner is a so called cleaner-less system in which a blade for wiping out the residual toner and a residual toner container can be eliminated. Therefore, the overall arrangement of the laser printer 1 can be simplified. In addition, the physical size and costs of the laser printer 1 can be reduced.

The photosensitive drum 27 is provided to a side of the developing roller 31 as a developing device, so as to face the developing roller 31. The photosensitive drum 27 is rotatable in a counterclockwise direction as indicated by the arrow in FIG. 2. The photosensitive drum 27 includes a main drum which is grounded. The surface (photosensitive layer) of the photosensitive drum 27 is formed of positively chargeable photosensitive layer including, for example, an amorphous silicon-based material, such as σ-Si:H, a cadmium sulfide-based material, such as Cds, a zinc oxide based-material, such as ZnO, a selenium-based material, such as AsSe3, or an organic photosensitive material, such as polycarbonate. A rotating shaft 27a, which is a driving shaft of the photosensitive drum 27, protrudes from the right and left sides of the photosensitive member cartridge 26. The rotating shaft 27a is rotatably driven by a power transmitted from a main motor (not shown).

The scorotron charger 29 is disposed above the photosensitive drum 27 with a predetermined distance therebetween, to prevent the scorotron charger 29 from contacting the photosensitive drum 27. The scorotron charger 29 is a positively charging charger that generates corona discharge from a charging wire made from tungsten or other material. The scorotron charger 29 uniformly and positively charges the surface of the photosensitive drum 27. A charging power source (not shown) turns on and off the scorotron charger 29.

The laser light emitted from the scanner unit 16 scans at high speed across the surface of the photosensitive drum 27, which is uniformly and positively charged by the scorotron charger 29. The surface of the photosensitive drum 27 is selectively exposed to the laser light. An electrostatic latent image is formed on the photosensitive drum 27 based on image data.

The transfer roller 30 is disposed below the photosensitive drum 27 so as to face the drum 27. The transfer roller 30 is supported in the photosensitive member cartridge 26 so as to rotate in a clockwise direction as indicated by the arrow in FIG. 2. The transfer roller 30 includes a metal roller shaft covered by a roller portion formed of an ionic conductive rubber material. A transfer bias is applied to the transfer roller 30 from a transfer bias application power source (not shown). Accordingly, the visible toner image on the photosensitive drum 27 is transferred onto the paper sheet 3 while the paper sheet 3 passes between the photosensitive drum 27 and the transfer roller 30.

A developing cartridge 28 used as a developing unit, is detachably mounted on the photosensitive member cartridge 26. The developing cartridge 28 includes the developing roller 31, a toner layer thickness regulating blade 32, a toner supply roller 33, and a toner box 34.

The toner box 34 accommodates a positively chargeable non-magnetic single component toner, as a developing agent. The toner is, for example, a polymerized toner that is obtained by copolymerizing polymerizable monomers using a known polymerization method, such as a suspension polymerization method. The polymerizable monomers may be styrene-based monomers, such as styrene, and acrylic-based monomers, such as acrylic acid, alkyl (C1–C4) acrylate, and alkyl (C1–C4) methacrylate. Polymerized toner particles are spherical in shape, and thus have excellent fluidity. To improve the fluidity of the toner, a coloring material, such as carbon black, and wax, as well as silica as an external additive are added to the toner particles. A toner particle size is approximately 6 to 10 $\mu$m.

Disposed in a substantially central portion of the toner box 34 is a rotating shaft 35. The rotating shaft 35 supports an agitator 36 that agitates the toner in the toner box 34 as the agitator 36 rotates in a counterclockwise direction as indicated by the arrow in FIG. 2. The toner is discharged from a toner supply opening 37 provided in the toner box 34. Provided in a side wall of the toner box 34 is a window 38 for detecting the amount of toner remaining in the toner box 34. The window 38 is cleaned by a cleaner 39 supported by the rotating shaft 35.

The toner supply roller 33 is disposed to a side of the toner supply opening 37 and rotates in a clockwise direction as indicated by the arrow in FIG. 2. The developing roller 31 is disposed in contact with the toner supply roller 33 and rotates in a clockwise direction as indicated by the arrow in FIG. 2. The toner supply roller 33 and the developing roller 31 contact each other so as to apply some pressure to each other.

The toner supply roller 33 includes a metal roller shaft covered by a roller portion formed of a conductive foam material. The developing roller 31 includes a metal roller shaft covered by a roller portion formed of a conductive rubber material. More specifically, the roller portion of the developing roller 31 is formed of conductive urethane rubber or silicone rubber including fine carbon particles. A surface of the roller portion of the developing roller 31 is coated with urethane rubber or silicone rubber including fluorine. A developing bias is applied to the developing roller 31 from a developing bias application power source (not shown).

Disposed adjacent to the developing roller 31 is the toner layer thickness regulating blade 32 that regulates the thickness of the toner layer on the developing roller 31. The regulating blade 32 includes a blade portion formed of a metal plate spring and a contact portion 40 attached to one end of the blade portion. The contact portion 40 has a semicircular cross-sectional shape and is formed of insulating silicone rubber. The other end of the blade portion is supported near the developing roller 31 by the developing cartridge 28. The contact portion 40 presses the developing roller 31 with the elasticity of the plate spring.

The toner discharged through the toner supply opening 37 is supplied onto the toner supply roller 33 and further onto the developing roller 31 by the rotation of the toner supply roller 33. The toner is positively charged through friction charging at a contact portion of the toner supply roller 33 and the developing roller 31. As the developing roller 31 rotates, the toner supplied onto the developing roller 31 enters between the contact portion 40 of the regulating blade 32 and the developing roller 31 where the toner is again charged through friction charging, to a sufficient degree. The toner passing between the contact portion 40 and the developing roller 31 is formed into a uniform-thickness thin toner layer on the developing roller 31.

Thereafter, in accordance with the rotation of the developing roller 31, the toner carried on the developing roller 31 and charged with positive polarity is deposited on the electrostatic latent image formed on the photosensitive drum 27, thereby making the image visible. In other words, the toner is supplied to parts of the photosensitive drum 27 selectively exposed to the laser light where the potential level is lower than the remaining part of the photosensitive drum surface uniformly positively charged. Thus, a visible toner image is formed on the photosensitive drum 27.

As shown in FIG. 1, the fixing unit 18 is disposed downstream of the process unit 17 in the sheet feeding direction. The fixing unit 18 includes a heat roller 41 and a pressure roller 42 that is pressed against the heat roller 41, as well as a pair of feeding rollers 43 disposed downstream of the heat roller 41 and the pressure roller 42 in the sheet feeding direction. The heat roller 41 is formed of metal and is provided with a halogen lamp as a heat source. When the sheet 3, which has the toner transferred thereon in the process unit 17, passes between the heat roller 41 and the pressure roller 42, the toner is fused by heat to fixedly adhere the toner to the sheet 3. After the toner is fixedly adhered to the sheet 3, the sheet 3 is transported or provided by the feeding rollers 43, to a discharge path 44. The sheet 3 is fed to discharge rollers 45, through the discharge path 44, and is discharged onto the discharge tray 46 by the discharge rollers 45.

Exemplary embodiments of the scanner unit 16 will be described below. As shown in FIG. 3, the polygon mirror 20 is driven by a polygon motor (not shown) so as to rotate about a rotating shaft 20a. In accordance with the rotation of the polygon mirror 20, the beam of the laser light emitted from the laser diode array 19 scans in an axial direction of the photosensitive drum 27 (in the main scanning direction), across the surface of the photosensitive drum 27, through the lenses 21, 23 and the reflecting mirror 22. A beam detecting (BD) sensor 70 for determining scanning timing is disposed to a side of a scanning area. The BD sensor 70 receives a beam of the laser light that reaches a region out of a printable area of the sheet 3 used in the laser printer 1.

As shown in FIG. 4, the laser diode array 19 includes two laser diodes LD1, LD2, and a photodiode PD for detecting an amount of the laser light emitted from the laser diodes LD1, LD2. The beam of the laser light emitted from each of the laser diodes LD1, LD2 is slightly shifted from each other in a sub scanning direction, reaching the surface of the photosensitive drum 27. Accordingly, the surface of the photosensitive drum 27 is scanned with the laser light, two lines at a time.

The laser diodes LD1, LD2 are driven by laser diode drivers (LDDs) 71, 72, respectively. The current that passes through the photodiode PD in response to the intensity of the light beam that the photodiode PD receives, is detected by a photodiode light amount detector 73. The LDDs 71, 72, the light amount detector 73, and the BD sensor 70 communicate with a light amount controlling circuit 75.

An anode of the laser diodes LD1, LD2 is connected to a power source 76. When an output level of the LDD 71, LDD 72 is low, the current is supplied to the laser diodes LD1, LD2, and accordingly, the laser diodes LD1, LD2 emit the laser light. An amount of the light emitted from the laser diodes LD1, LD2 is associated with the current that passes therethrough. The LDDs 71 and 72 input thereto from the light amount controlling circuit 75, Data 1 and Data 2 pulse signals, respectively, that makes a transition to LOW or HIGH in association with print data, as well as light amount data indicating the value of current that passes through the laser diodes LD1, LD2 when the laser diodes LD1, LD2 emit the light.

The light amount controlling circuit 75 communicates with an image processing device 80 that communicates with a control panel 77 provided on the main casing 2 and an interface 78 through which the print data from an external device, such as a personal computer (PC) is input. The image processing device 80 includes a central processing unit (CPU) 81, a read-only memory (ROM) 82, and a random-access memory (RAM) 83. The image processing device 80 generates and outputs rectangular Data 1 and Data 2 pulses, based on the print data input from the PC through the interface 78. The image processing device 80 also outputs Cal 1 and Cal 2 pulse signals for providing timing for the photodiode PD to detect the laser light emitted from the laser diodes LD1, LD2, and a Half signal for reducing the amount of the laser light emitting from the laser diodes LD1, LD2 to half of a normal light emitting amount. The Data 1, Data 2, Cal 1, Cal 2, and Half signals are input to the light amount controlling circuit 75.

The RAM 83 in the image processing device 80 includes an operating life register 83a for the laser diode LD1 that stores data on an operating life of the laser diode LD1, and an operating life register 83b for the laser diode LD2 that stores data on an operating life of the laser diode LD2. The image processing device 80 performs following operations based on the data stored in the operating life registers 83a, 83b for the laser diodes LD1, LD2, respectively.

Figure 5:
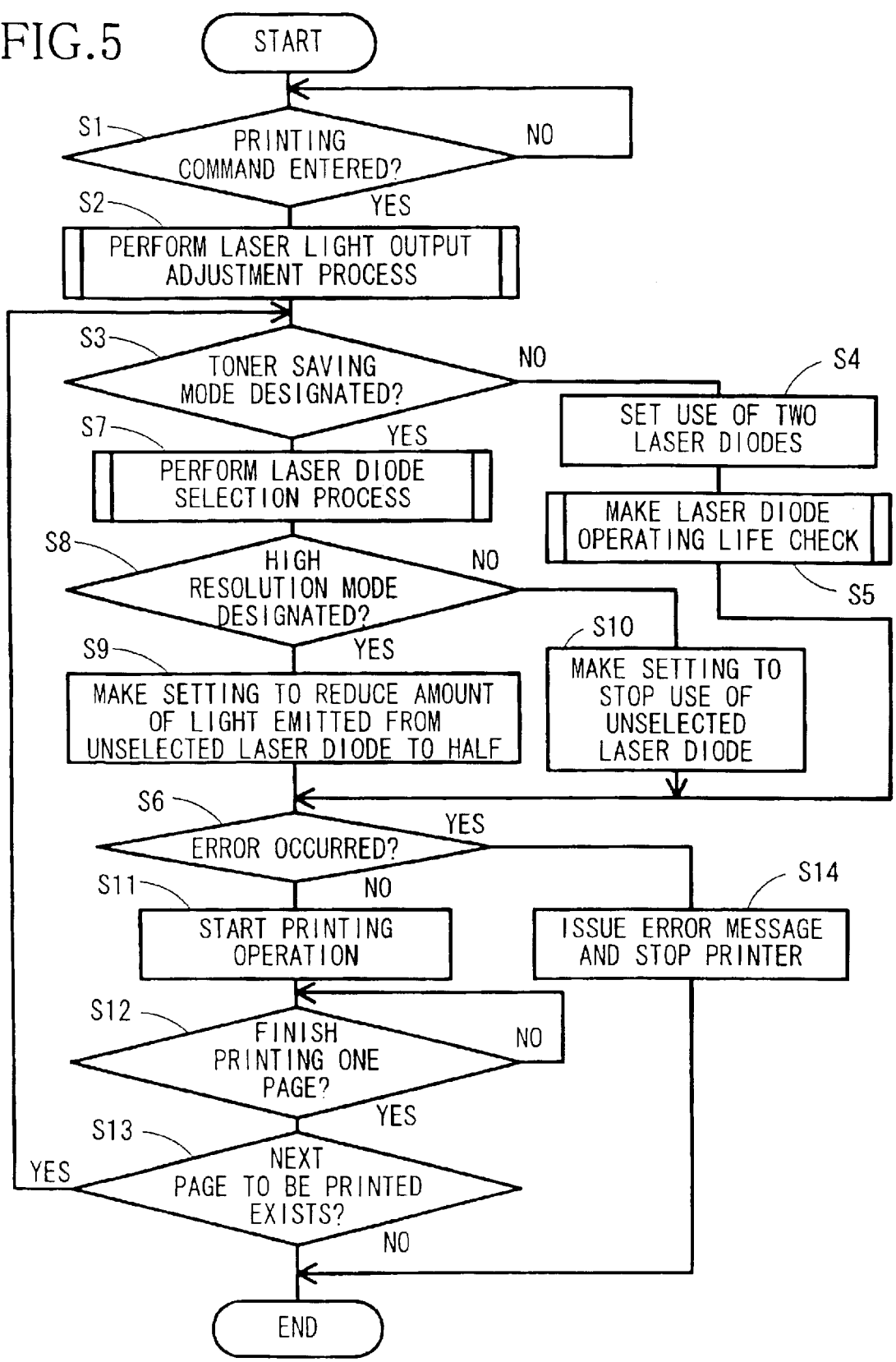
FIG. 5 is a flowchart illustrating a main routine performed by the control system.
Figure 6:
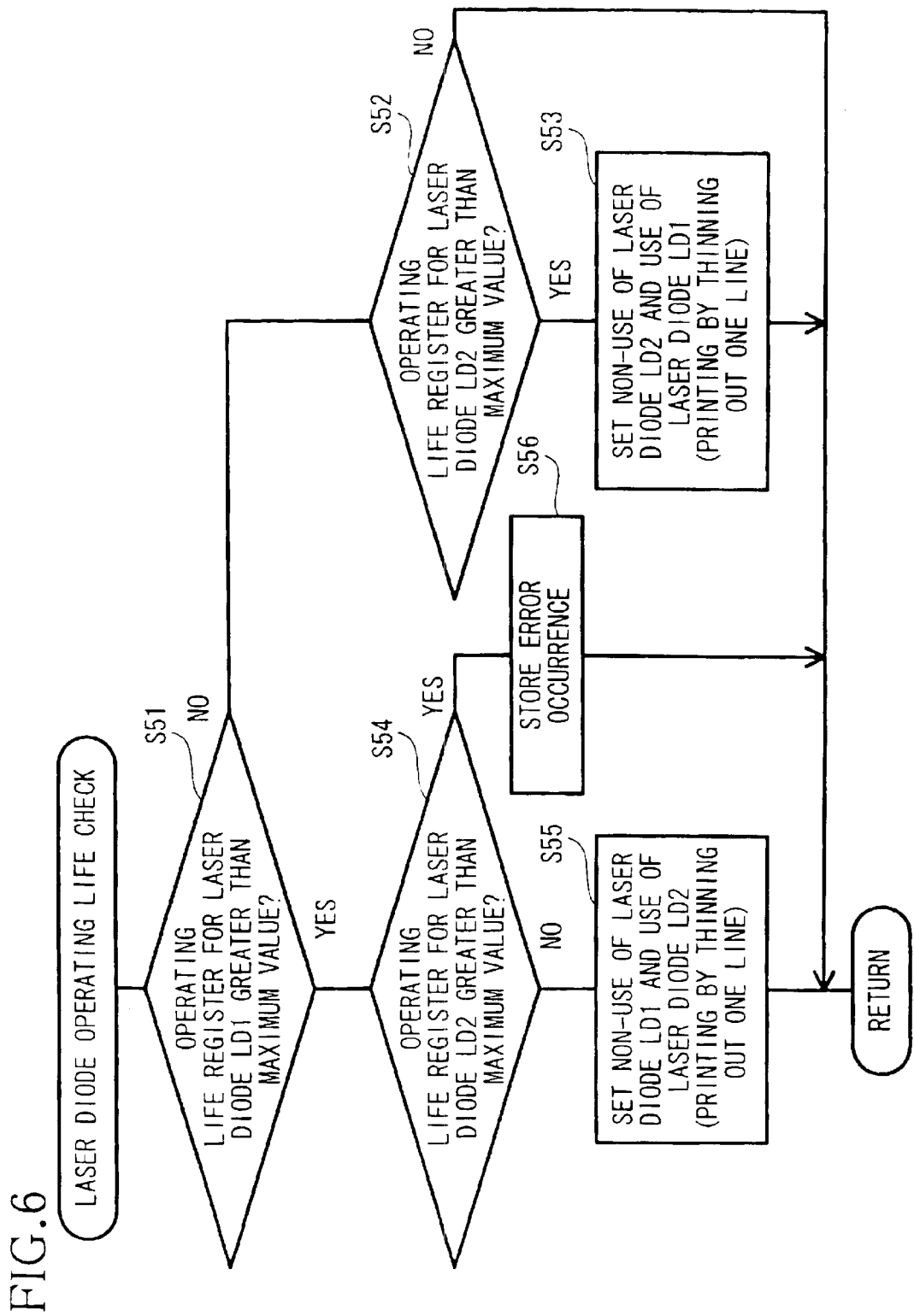
FIG. 6 is a flowchart illustrating a laser diode operating life check made during the main routine.
Figure 7:
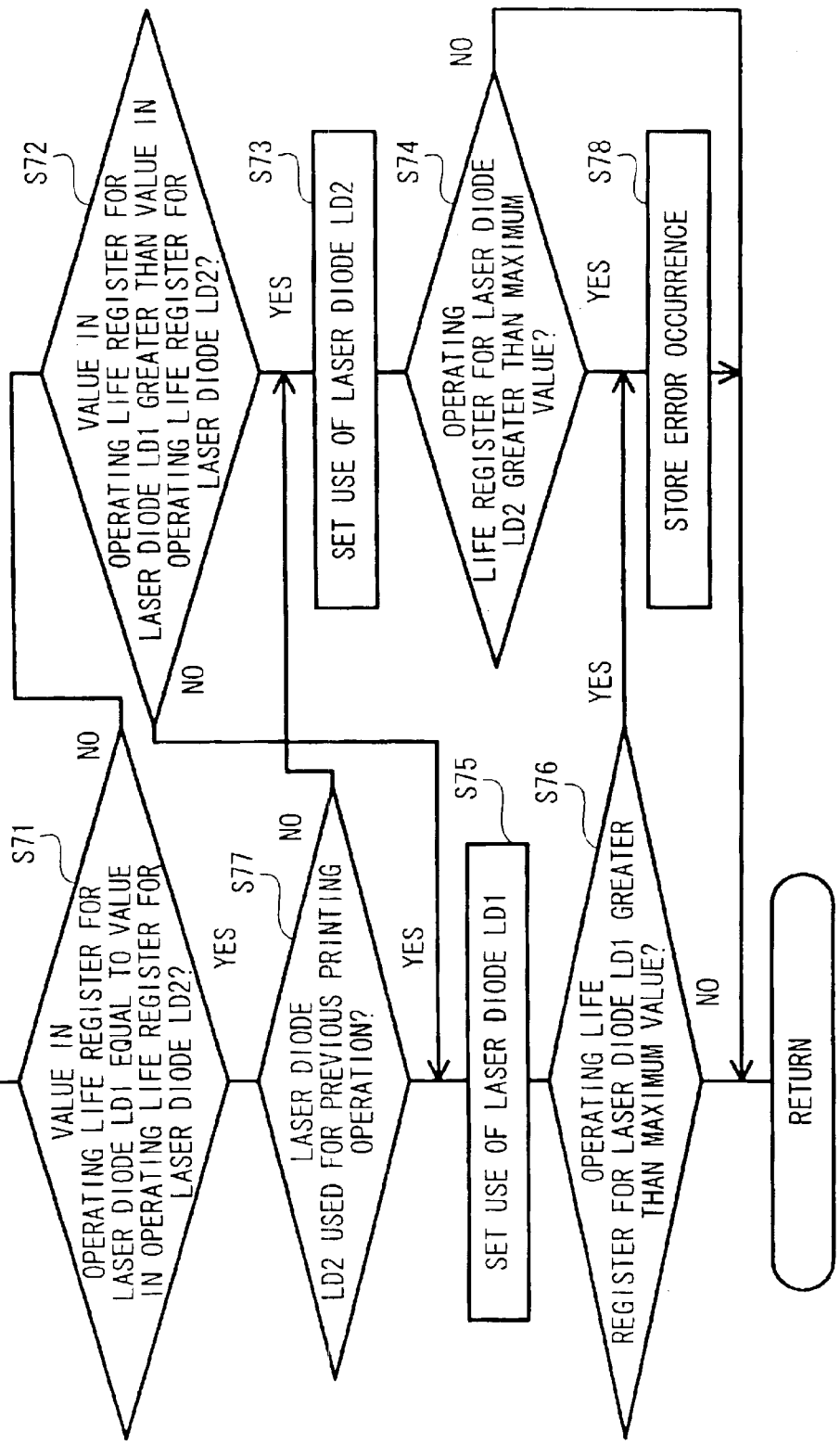
FIG. 7 is a flowchart illustrating a laser diode selection process made during the main routine.

FIGS. 5 to 7 show flowcharts that the image processing device 80 performs. When the laser printer 1 is turned on, the image processing device 80 starts the main routine shown in FIG. 5. In step S1, it is determined whether a print command is entered as print data is input through the interface 78. When the print command is not entered (S1: NO), flow waits in step S1 for the print command to be entered. When the print command is entered (S1: YES), flow proceeds to step S2 where a laser light output adjustment process is performed. The laser light output adjustment process will be described in detail below with reference to FIG. 8.

FIG. 8 is a time chart showing changes of various signals during the laser light output adjustment process. As shown in FIG. 8, the image processing device 80 outputs low Data 2 and Data 1 rectangular pulses in this order at an interval that the polygon mirror 20, which starts to rotate as the power is turned on, is rotated 60 degrees.

As shown in FIG. 3, the polygon mirror 20 according to the embodiment is substantially regular hexagonal when viewed from the top. Each of the six sides of the polygon mirror 20 has mirror finished surface. One side of the polygon mirror 20 is associated with one scanning line on the photosensitive drum 27.

While the polygon mirror 20 is rotated 60 degrees, a surface of the photosensitive drum 27 is scanned with the laser light beam in one way along a longitudinal direction of the photosensitive drum 27.

When the Data 2 or Data 1 pulse signal is turned into LOW, the laser diode LD2 or LD1 emits the laser light, as described above. The low rectangular Data 2 and Data 1 pulses are sequentially output at the timing that the laser light emitted from the laser diodes LD2, LD1 are reflected off the polygon mirror 20 and directed to a region outside the printable area toward the BD sensor 70. The low Data 1 pulse is output longer to ensure the BD sensor 70 to detect the laser light emitted from the laser diode LD1. A signal output by the BD sensor 70 is shown as BDN in FIG. 8. Based on the BDN signals, output timings of the Data 1 and Data 2 pulses are determined.

The image processing device 80 outputs low Cal 1 and Cal 2 rectangular pulses, in synchronization with the output of the low Data 1 and Data 2 pulses, respectively. When the low Cal 1 and Cal 2 pulses are output, an adjustment is made to the light amount data based on the intensity of the light detected by the light amount detector 73 in order for the laser diodes LD1, LD2 to emit the laser light at a predetermined intensity. For example, at a timing indicated by "A" in FIG. 8, a value of the current supplied to the laser diode LD1 is adjusted such that the laser diode LD1 emits the beam of the laser light at the predetermined intensity. At a timing indicated by "B" in FIG. 8, a value of the current supplied to the laser diode LD2 is adjusted such that the laser diode LD2 emits the beam of the laser light at the predetermined intensity.

The thus adjusted values of the current are stored in a predetermined area of the RAM 83, as well as in the operating life registers 83a, 83b for the laser diodes LD1, LD2. As a total light emitting time of a laser diode increases, a current required for the laser diode to emit the light at a predetermined intensity also increases. In this embodiment, the values of the current after being adjusted are used as parameters for determining the end of the operating life of the laser diodes LD1, LD2.

When the Cal 1 and Cal 2 pulses are output, voltage or power applied to the laser diodes LD1, LD2 may be adjusted instead of current. The values of the voltage or power after being adjusted may be stored in the operating life registers 83a, 83b for the laser diodes LD1, LD2. The values of current, voltage, or power properly reflect the substantial operating life of each of the laser diodes LD1, LD2, which generally have some quality variances between the laser diodes LD1, LD2.

Referring back to FIG. 5, after the laser light output adjustment process is performed in step S2, the process continues to step S3 where it is determined whether a toner saving mode is designated using the control panel 77 of the laser printer 1 or the PC, to save a consumption amount of the toner. When the toner saving mode is not designated (S3: NO), flow proceeds to step S4 where the number of the laser diodes to be used for scanning is set to two to use both laser diodes LD1, LD2. Thereafter, a laser diode operating life check is made in step S5.

The laser diode operating life check will now be described in detail with reference to FIG. 6. In step S51, it is determined whether the current value stored in the operating life register 83a for the laser diode LD1 is greater than a maximum allowable current value (hereinafter referred to as the maximum value). More specifically, as the total light emitting time of the laser diode LD1 becomes longer, that is, as the laser diode LD1 approaches the end of its operating life, a current value to be stored in the operating life register 83a becomes greater. Accordingly, it is determined in step S51 whether the value stored in the operating life register 83a exceeds the maximum value and the life of the laser diode LD1 has expired.

When the value stored in the operating life register 83a for the laser diode LD1 is equal to or less than the maximum value (S51: NO), it is determined in step S52 whether the value stored in the operating life register 83b for the laser diode LD2 is greater than the maximum value. When the value stored in the operating life register 83b is equal to or less than the maximum value (S52: NO), flow proceeds to step S6 shown in FIG. 5. In other words, the operating life of each laser diode LD1, LD2 has not yet expired, so that the laser diodes LD1, LD2 can be both usable. Thus, the setting made in step S4 to use both laser diodes LD1, LD2 can be maintained.

In step S52, when it is determined that the value stored in the operating life register 83b for the laser diode LD2 exceeds the maximum value and the operating life of the laser diode LD2 has expired (S52: YES), flow proceeds to step S53 where non-use of the laser diode LD2 and use of the laser diode LD1 are set. Thereafter, flow proceeds to step S6 in FIG. 5. Accordingly, the laser diode LD2 whose life has expired is not used. Using only the laser diode LD1, a printing operation is carried out at substantially a lower resolution, while one line is being thinned out or skipped, even when the low resolution mode is not designated.

In step S51, when it is determined that the value stored in the operating life register 83a for the laser diode LD1 exceeds the maximum value and the life of the laser diode LD1 has expired (S51: YES), flow proceeds to step S54 where it is determined whether the value stored in the operating life register 83b for the laser diode LD2 exceeds the maximum value. When the value stored in the operating life register 83b is equal to or less than the maximum value (S54: NO), non-use of the laser diode LD1 and use of the laser diode LD2 are set in step S55. Thereafter, flow proceeds to step S6 in FIG. 5. Accordingly, the laser diode LD1 whose life has expired is not used. Using only the laser diode LD2, the printing operation is carried out at substantially a lower resolution, while one line is being thinned out or skipped, even when the low resolution mode is not designated.

When it is determined that the operating life of the laser diode LD1 has expired (S51: YES) and then determined that the value stored in the operating life register 83b for the laser diode LD2 exceeds the maximum value (S54: YES), neither laser diodes LD1 or LD2 can be used, because the operating lives of both of the laser diodes LD1, LD2 have expired. In this case, an error occurrence is stored in the RAM 83 in step S56 and then flow proceeds to step S6.

Referring back to FIG. 5, when the toner saving mode is designated (S3: YES), flow proceeds to step S7 where a laser diode selection process is performed to select one of the laser diodes LD1, LD2. Then, flow proceeds to step S8 where it is determined whether a high resolution mode is designated.

When the high resolution mode is designated (S8: YES), a setting is made in step S9 for reducing an amount of the laser light emitted from the laser diode LD1 or LD2, which has not been selected in step S7, to half. The Half signal is input to the light amount controlling circuit 75, and then flow proceeds to step S6.

When the high resolution mode is not designated (S8: NO), a setting is made in step S10 for stopping the driving of the laser diode LD2 or LD1 which has not been selected in step S7. Then, flow proceeds to step S6.

The laser diode selection process performed in step S7 will be described in detail with reference to a flowchart shown in FIG. 7. In step S71, it is determined whether the value stored in the operating life register 83a for the laser diode LD1 is equal to the value stored in the operating life register 83b for the laser diode LD2. When the values stored in the operating life registers 83a, 83b are not equal (S71: NO), flow proceeds to step S72 where the value stored in the operating life register 83a for the laser diode LD1 is greater than the value stored in the operating life register 83b for the laser diode LD2.

When the value in the operating life register 83a is greater than the value in the operating life register 83b (S72: YES), flow proceeds to step S73 where the use of the laser diode LD2 is set. In the subsequent step S74, it is determined whether the value in the operating life register 83b exceeds the maximum value. When it is determined that the value in the register 83b does not exceed the maximum value (S74: NO), flow proceeds to step S8 in FIG. 5. Thus, use of the laser diode LD2 associated with the operating life register 83b storing the smaller value, is set for scanning.

Thereafter, when it is determined that the high resolution mode is designated (S8: YES), the image processing device 80 makes a setting in step S9 to reduce the amount of the laser light emitted from the laser diode LD1 to half and outputs the Half signal. When the high resolution mode is not designated (S8: NO), the image processing device 80 makes a setting in step S10 to stop the use of the laser diode LD1.

In step S72, when the value in the operating life register 83a for the laser diode LD1 is not greater than the value in the operating life register 83b for the laser diode LD2 (S72: NO), flow proceeds to step S75 where the use of the laser diode LD1 is set. Thereafter, in the step S76, it is determined whether the value in the operating life register 83a for the laser diode LD1 exceeds the maximum value. When it is determined that the value in the register 83a does not exceed the maximum value (S76: NO), flow proceeds to step S8 in FIG. 5. Thus, use of the laser diode LD1 associated with the operating life register 83a storing the smaller value, is selected for scanning.

Thereafter, when it is determined that the high resolution mode is designated (S8: YES), the image processing device 80 makes a setting in step S9 to reduce the amount of the laser light emitted from the laser diode LD2 to half and outputs the Half signal. When the high resolution mode is not designated (S8: NO), the image processing device 80 makes a setting in step S10 to stop the use of the laser diode LD2.

When the values stored in the operating life registers 83a, 83b for the laser diodes LD1, LD2 are equal (S71: YES), flow proceeds to step S77 where it is determined whether the laser diode used for a previous printing operation performed using either laser diode LD1 or LD2 is the laser diode LD2. When it is determined that the laser diode LD2 is used for the previous printing operation (S77: YES), flow proceeds to step S75 where the use of the laser diode LD1 is set. When it is determined that the laser diode LD2 is not used for the previous printing operation (S77: NO), flow proceeds to step S73 where the use of the laser diode LD2 is set. In other words, when the values stored in the operating life registers 83a, 83b are equal (S71: YES), the laser diodes LD1, LD2 are alternatively selected.

In step S74, when it is determined that the value in the operating life register 83b for the laser diode LD2 exceeds the maximum value (S74: YES), an error occurrence is stored in the RAM 83 in step S78, because the value stored in the operating life register 83a for the laser diode LD1 also exceeds the maximum value, that is, the operating live of both of the laser diodes LD1, LD2 have expired. Thereafter, flow proceeds to step S8 in FIG. 5.

Similarly, in step S76, when it is determined that the value in the operating life register 83a for the laser diode LD1 exceeds the maximum value (S76: YES), an error occurrence is stored in the RAM 83 in step S78, because the value stored in the operating life register 83b for the laser diode LD2 also exceeds the maximum value, that is, the operating lives of both of the laser diodes LD1, LD2 have expired. Thereafter, flow proceeds to step S8 in FIG. 5.

Referring back to FIG. 5, when flow proceeds to step S6 after step S5, S9 or S10, it is determined whether the error occurrence is stored in the RAM 83 in step S56 in the laser diode operating life check in step S5, or in step S78 in the laser diode selection process in step S7. When the error occurrence is stored in step S56 or S78 (S6: YES), flow proceeds to step S14 where an error message is outputted to the control panel 77 and the laser printer 1 is stopped, whereupon flow ends.

When the error occurrence is not stored in the RAM 83 (S6: NO), flow proceeds to step S11 where a print start is instructed. Thereafter, the printing operation is started in accordance with another routine (not shown), using both or one of the laser diodes LD1, LD2.

FIG. 9 is a time chart showing changes of various signals when the printing operation is performed using both of the laser diodes LD1, LD2. The low Data 2 pulse is output at the time when the beam of laser light emitted from the laser diode LD2 reaches an area of the photosensitive drum 27 associated with a region outside of the printable area. The low Data 1 pulse is output at the time when the Data 2 pulse signal makes a LOW to HIGH transition.

Based on the Data 1 and Data 2 pulses, the laser diodes LD1, LD2 emit the laser light. At the time the laser diodes LD1, LD2 emit the laser light, the low Cal 1 and Cal 2 pulses are output in synchronization with the Data 1 and Data 2 pulses, respectively. At this time, the amounts of the laser light emitted from the laser diodes LD1, LD2 are detected by the light amount detector 73. Based on the detected light emitting amounts, the light amount controlling circuit 75 determines the current to be supplied to the laser diodes LD1, LD2 by the driving of the LDD1, LDD2. The determined current values are stored in the operating life registers 83a, 83b for the laser diodes LD1, LD2.

The beam of the laser light emitted from the laser diode LD1 in accordance with the low Data 1 rectangular pulses, is detected by the BD sensor 70. Based on the detection the laser beam by the BD sensor 70, a BDN rectangular pulse is output. Detection by the light amount controlling circuit 75 of a falling edge of the BDN pulse output from the BD sensor 70 triggers the output of the Data 1, Data 2 pulse signals for one line to the LDD1, LDD2. More specifically, the light amount controlling circuit 75 outputs the Data 1, Data 2 pulse signals for one line to the LDD1, LDD2, in accordance with the Data 1, Data 2 pulse signals that are output from the image processing device 80 based on image data. In FIG. 9, the Data 1, Data 2 pulse signals for one line is indicated by "X", and the transitions of the pulse signals are not specified for the simplicity of the illustration. In practice, the Data 1, Data 2 pulse signals make fine transitions from LOW to HIGH and vice versa, in accordance with the image data.

When the Data 1, Data 2 pulse signals output from the LDD1, LDD2 make a transition to LOW, the laser beams are emitted from the respective laser diodes LD1, LD2. The laser beams emitted from the laser diodes LD1, LD2 are reflected off the polygon mirror 20 and scan across the surface of the photosensitive drum 27.

When the Data 1, Data 2 pulse signals for one line are completely output based on the image data, the light amount controlling circuit 75 again outputs the low Data 2 rectangular pulse, and then low Data 1 rectangular pulse at the timing when the Data 2 pulse makes a LOW to HIGH transition, as described above. The pulse signals are thus output repeatedly during the printing operation.

Referring back to FIG. 5, in step S12, when printing for one page is finished (S12: YES), it is determined in step S13 whether there is another page to be printed. When there is another page to be printed (S13: YES), flow returns to step S3 and the above-described process steps are repeated. When there is no page to be printed (S13: NO), flow ends.

FIG. 9 shows the time chart when both laser diodes LD1, LD2 are used. In the case where either laser diode LD1 or LD2 is used, the laser diode LD1 or LD2, whichever is used, may be controlled in accordance with the Data 1 and Cal 1 pulse signals. In this case, an output timing of a falling edge of the low Data 1 pulse, may be the same as the output timing of that of the low Data 2 pulse shown in FIG. 9, or slightly thereafter.

In the laser printer 1 according to the embodiment, when the toner saving mode is designated (S3: YES) and the high resolution mode is designated (S8: YES), the amount of the laser light emitted from one of the laser diodes LD1, LD2 is reduced to half (in step S9). The amount of the toner (developing agent) attached to lines associated with the laser diode LD1, LD2 whose light emitting amount is reduced to half, is reduced, but some toner is attached. Thus, the developing agent can be saved while degradation in image quality is controlled.

When the toner saving mode is designated (S3: YES) and the high resolution mode is not designated (S8: NO), only one laser diode LD1 or LD2 is used and the other laser diode LD2 or LD1 is not driven (in step S10). Therefore, the developing agent can be remarkably saved.

In the above-described embodiment, the laser diode whose the light emitting amount is reduced to half or whose driving is stopped, is not limited to specific one of the laser diodes LD1, LD2. Based on results of the comparison of values stored in the operating life registers 83a, 83b, the driving of the laser diode LD1, LD2 associated with the operating life register 83a, 83b storing the greater value is stopped. In other words, the driving of the laser diode LD1, LD2 that has a shorter operating life is stopped. Accordingly, both laser diodes LD1, LD2 become unusable at timings close to each other.

The laser diode array 19 is normally soldered onto a printed circuit board. When the laser diode LD1, LD2 becomes unusable, replacement of the printed circuit board, the scanner unit 16, or the laser printer 1 is required. In the case where a laser printer includes a plurality of laser diodes, like the laser printer 1 according to the embodiment, if one of the laser diodes becomes unusable, other usable laser diodes also have to be replaced with new ones together with the unusable laser diode. However, in the laser printer 1 according to the embodiment, the usable laser diode LD1 or LD2 is not wasted, because the laser printer 1 is controlled such that a plurality of the laser diodes LD1, LD2 become unusable at the timings close to each other. Thus, the best possible use of the laser diodes LD1, LD2 during their usable periods, may be made without wasting any of the usable laser diodes LD1 or LD2.

For example, in the case where the laser diodes LD1, LD2 are separately replaceable, the timings to replace the laser diodes LD1, LD2 can be brought close to each other. In the case where the laser diodes LD1, LD2 are replaced together at a time, the number of the replacement can be reduced.

When only one laser diode LD1 or LD2 is used for the printing with the laser printer 1, the values stored in the operating life registers 83a, 83b are compared. Based on the comparison result, driving of the laser diode LD1, LD2 associated with the operating life register 83a, 83b storing the greater value is stopped, as described above. Therefore, a specific laser diode is not continuously used or does not become unusable earlier. Thus, the best possible use of the laser diodes LD1, LD2 may be made during their usable periods.

The current values that reflect quality variances among the laser diodes are used for the comparison of an operating life of the laser diodes LD1, LD2. By the use of the current values, the time when the laser diodes LD1, LD2 reach the end of the operating life thereof can be brought close to each other with great accuracy.

While the invention has been described in detail and with reference to the specific embodiment thereof, it would be apparent to those skilled in the art that various changes, arrangements and modifications may be applied therein without departing from the spirit and scope of the invention.

For example, although the operating life registers 83a, 83b write thereinto the current values in the above-described embodiment, the operating life registers 83a, 83b may write thereinto data on the light emitting amount when a predetermined current is supplied to the laser diodes LD1, LD2. In this case, the light emitting amount becomes smaller as the total driving time of the laser diode LD1, LD2 becomes longer. Thus, determination as to which laser diode LD1 or LD2 is closer to the end of the operating life thereof, can be made.

Instead, the operating life registers 83a, 83b may write thereinto the number of image dots formed with the laser diodes LD1, LD2. In this case, the number of dots becomes greater as the total driving time of the laser diode LD1, LD2 becomes longer. Thus, it may be determined which the laser diode LD1, or LD2 is closer to the end of its operating life.

Thus, a comparison process using the number of dots may be simplified as compared with that using the current values.

A driving amount of the laser diode LD1 during a period associated with the low Cal 1 pulse is slightly greater than that of the laser diode LD2 during a period associated with the low Cal 2 pulse, because the Cal 1 pulse is longer than the Cal 2 pulses. However, the difference in the driving amounts of the laser diodes LD1, LD2 is such a negligible amount for the calculation of the number of dots to determine the operating life of the laser diode LD1, LD2.

When the laser diode LD1, LD2 is controlled such that the amount of the laser light emitted therefrom is reduced as in step 9, an amount of the laser light that the photosensitive drum 27 is irradiated therewith is reduced. In other words, a light exposure amount for the photosensitive drum 27 is reduced. Shortening degree of the operating life of the laser diode LD1, LD2 is lower when one dot image is formed with the light exposure amount being reduced, than when one dot image is formed without reducing the light exposure amount. When the number of dots are used for the determination of the operating life of the laser diodes LD1, LD2, weight needs to be given for the calculation of the number of dots.

The light exposure amount may be reduced, for example, by outputting from the light amount controlling circuit 75 to the LDD1 71 or LDD2 72, the light amount data indicating such a current value that reduces the light emitting amount of the laser diode LD1 or LD2 to half, based on the Half signal output from the image processing device 80, or by reducing the pulse width associated with one dot.

Figure 10A:
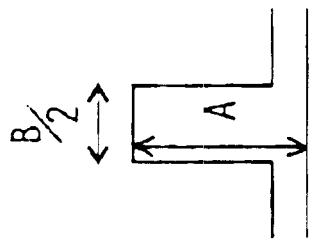
FIGS. 10A to 10C are schematics illustrating techniques to reduce a light exposure amount.
Figure 10B:
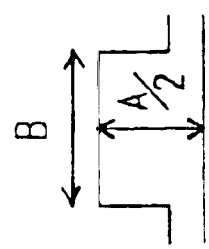

FIG. 10A shows a dot formed by exposing the photosensitive drum 27 to the laser beam emitted from the laser diode LD1, LD2 by the application of normal current A during a period corresponding to a normal pulse width B. FIG. 10B shows a dot formed by exposing the photosensitive drum 27 to the laser beam emitted from the laser diode LD1, LD2 by the application of half of the normal current A during a period corresponding to the normal pulse width B.

When the photosensitive drum 27 is exposed to the laser beam by the application of half of the normal current (A/2), as shown in FIG. 10B, the dot is shaped substantially the same as that formed by the application of the normal current A. However, the amount of the toner attached to the photosensitive drum 27 is reduced and the density of an image becomes lower. In this case, no changes are required for the Data 1, Data 2 rectangular pulses, which are output based on the image data. Only the output from the laser diode is adjusted, and the relatively good image quality is obtained.

In the latter case where the width of a pulse associated with one dot is reduced, the image processing device 80 reduces the width of the Data 1, Data 2 rectangular pulse per dot. No changes in the light amount data indicating the current value are made.

Figure 10C:

FIG. 10C shows a dot formed by exposing the photosensitive drum 27 to the laser beam emitted from the laser diode LD1, LD2 by the application of the normal current A during a period corresponding to half of the normal pulse width B. As compared with the dot shown in FIG. 10A, the width of the dot shown in FIG. 10C is reduced approximately to half, though the density of the dot is not changed. As the width of the dots is reduced, the density of an image becomes lower and relatively good image quality is not obtained.

According to degree of reduction of the light exposure amount, the current that passes through the laser diode LD1, LD2 or the pulse width per dot may be adjusted. The degree of reduction of the light exposure amount may be changed according to settings made by a user using the control panel 77, as to what percentage of toner is to be saved.

The invention may be applied to various electrophotographic image forming devices, such as facsimile machines, that include a plurality of laser diodes, other than laser printers. Although the number of the laser diodes used in the above-described embodiment is two, the invention may be applied to image forming devices including three or more laser diodes.

When an image forming device includes three or more laser diodes, the laser diodes may be controlled in such a manner that the light exposure amount of any of the laser diode(s) is reduced. The following controlling techniques or approaches may be employed in the laser diode selection process performed in step S7.

(1) The laser diode associated with the operating life register storing the smallest value may be used without reducing the amount of the laser light emitted therefrom. The other laser diodes are not used or used by reducing the amount of the laser light emitted therefrom. (2) The laser diode associated with the operating life register storing the largest value, may not be used or used by reducing the amount of the laser light emitted therefrom. The other laser diodes may be used without reducing the amount of the laser light emitted therefrom. (3) The laser diodes may be selected by a predetermined number from the laser diode associated with the operating life register storing the smallest value first, in the ascending order of the values stored in the operating life register for each laser diode. In a case, such as (3), where the predetermined number of the laser diodes is used for scanning, the number of the laser diodes to be used may be changed according to modes selected by a user. For example, when the toner saving mode is selected, only one laser diode may be used. When the toner saving mode is not selected, two laser diodes may be used for printing at low resolution.

What is claimed is:

1. An image forming apparatus, comprising:
   a photosensitive member;
   an exposure device including at least two laser emitting elements irradiating laser beams capable of irradiating lines of the number of the laser emitting elements, the laser beams being scanned at a same time on the photosensitive member line by line to form an electrostatic latent image on the photosensitive member;
   a developing device that supplies a developing agent to the electrostatic latent image to form a visible image; and
   a controller that controls the at least two laser emitting elements to irradiate the laser beams in a predetermined light amount;
   wherein the controller further controls at least one of the at least two laser emitting elements to irradiate the laser beam in a reduced light amount every at least one line.

2. The image forming apparatus according to claim 1, wherein the controller controls at least two laser emitting elements to irradiate the laser beams in the reduced light amount by shortening a period of the irradiation for one dot.

3. The image forming apparatus according to claim 1, wherein the controller controls at least one of the at least two laser emitting elements to irradiate the laser beam in the reduced light amount by shortening a period of the irradiation for one dot.

4. The image forming apparatus according to claim 3, wherein the controller reduces the period of current applied to the at least one of the laser emitting elements.

5. The image forming apparatus according to claim 1, wherein the controller controls the at least one of the at least two laser emitting elements to irradiate the laser beam in the reduced light amount by reducing a current applied to the at least one of the laser emitting elements.

6. The image forming apparatus according to claim 1, wherein the exposure device includes two laser emitting elements capable of irradiating two separated lines of the laser beam, the controller controls one of the laser emitting elements to irradiate the laser beam in the reduced light amount.

7. The image forming apparatus according to claim 6, the controller controls the one of the laser emitting elements to irradiate the laser beam in the reduced light amount by shortening a period of the irradiation for one dot.

8. The image forming apparatus according to claim 7, wherein the controller reduces the period of current applied to the one of the laser emitting elements.

9. The image forming apparatus according to claim 6, wherein the controller controls the at least one of the laser emitting elements to irradiate the laser beam in the reduced amount by reducing a current applied to the at least one of the laser emitting elements.

10. The image forming apparatus according to claim 1, wherein the controller further comprises:
means for determining which one of the at least two laser emitting elements is closest to reaching its end of operating life, the controller controlling the determined one laser emitting element to irradiate the laser beam in the reduced light amount.

11. The image forming apparatus according to claim 10, wherein the determining means determines the operating life of each of the at least two laser emitting elements based on applied current to each of the at least two laser emitting elements for a predetermined intensity irradiation.

12. The image forming apparatus according to claim 10, wherein the determining means determines the operating life of each of the at least two laser emitting elements based on dot numbers that the image forming apparatus formed.

13. The image forming apparatus according to claim 6, wherein the controller further comprises:
means for determining which one of the two laser emitting elements is closest to reaching its end of operating life, the controller controlling the determined one laser emitting element to irradiate the laser beam in the reduced light amount.

14. The image forming apparatus according to claim 13, wherein the determining means determines the operating life of each of the two laser emitting elements based on applied current to each of the at least two laser emitting element for a predetermined intensity irradiation.

15. The image forming apparatus according to claim 13, wherein the determining means determines the operating life of each of the two laser emitting elements based on dot numbers that the image forming apparatus formed.

16. An image forming apparatus, comprising:
a photosensitive member;
an exposure device including at least two laser emitting elements, each laser emitting element being capable to irradiate a laser beam, the laser beam from each one of the at least two laser emitting elements being scanned at a same time on the photosensitive member line by line to form an electrostatic latent image on the photosensitive member;
a developing device that supplies a developing agent to the electrostatic latent image to form a visible image; and
a controller that controls one or more of the at least two laser emitting elements to irradiate the laser beam in a predetermined light amount;
wherein the controller further controls one or more of the at least two laser emitting elements to irradiate the laser beam in a reduced light amount every at least one line.

17. The image forming apparatus according to claim 16, wherein the controller further comprises:
a determining device that determines which one of the at least two laser emitting elements is closest to reaching its end of operating life, the controller controlling the determined one laser emitting element to irradiate the laser beam in the reduced light amount.

18. The image forming apparatus according to claim 17, wherein the determining device determines the end of operating life of each of the at least two laser emitting elements based on applied current to each of the at least two laser emitting elements for a predetermined intensity irradiation.

19. The image forming apparatus according to claim 17, wherein the determining device determines the end of operating life of each of the at least two laser emitting elements based on dot numbers that the image forming apparatus formed.

* * * * *